UNITED STATES PATENT OFFICE 2,248,155

PROCESS FOR THE PRODUCTION OF INDOLE ACIDS

Carl N. Zellner, Rahway, N. J., assignor to Merck & Co. Inc., Rahway, N. J., a corporation of New Jersey No Drawing. Application June 28, 1938, Serial No. 216,283

7 Claims. (Cl. 260—319)

This invention relates to processes for the production of acids in which a lower fatty acid residue is substituted in $\beta$-position with respect to the N-atom in the pyrrole ring of an indole nucleus.

These indole acids have various uses. They are now finding application as stimulants of plant-root growth, etc.

I have now found a method of preparing these indole acids which is highly satisfactory in that the desired products may be prepared relatively inexpensively, and in good yield.

The process of my invention involves, as principal reactants, the tri-carboxylic acid ester obtained by condensing an ester of oxalic acid with an ester of a higher di-basic acid of the aliphatic dicarboxylic acid series, and phenyl hydrazine. Three principal operations are involved as follows:

1. Condensation of the oxalic acid ester and the higher aliphatic dicarboxylic acid ester;
2. Condensation of the tri-ester obtained by (1) with phenyl hydrazine, followed by hydrolysis, partial decarboxylization and Fischer ring closure. Alternatively, hydrolysis and partial decarboxylization may be effected, followed by condensation with phenyl hydrazine and Fischer ring closure.
3. Decarboxylization of the reaction product of (2) to the desired $\beta$-substituted indole acid.

Condensation of the esters of the dibasic acids may be preferably carried out (1) in the presence of alcohol-free sodium ethylate in ether or benzene, or (2) in the presence of finely divided sodium in petrolatum-xylene. Any ester of oxalic acid may be condensed with an ester of a higher dibasic acid to form the tri-carboxylic acid ester. Esters of these acids with lower aliphatic alcohols have been found suitable, and the exemplifications of this step of the process, as shown herein, are given in terms of such an ester, that is, the ethyl ester.

Condensation of the tri-ester and phenyl hydrazine is carried out in the presence of a condensing agent capable of effecting Fischer ring closure to the indole nucleus, such as dilute hydrochloric acid or other mineral acids.

Partial decarboxylization occurs as a result of the acid hydrolysis of the tri-basic acid ester. The complete decarboxylization of the $\alpha$-carboxyindole acid is effected by thermal treatment, preferably by heating the acid in a suitable high-boiling solvent such as tetralin.

It is also possible according to my process, to simultaneously effect condensation of the phenyl hydyrazine and tri-ester, and hydrolysis and partial decarboxylization to give the $\alpha$-carboxy di-acid. Also, the tri-ester may first be hydrolyzed and decarboxylized, and the condensation with phenyl hydrazine effected subsequently.

The operation of the process, in terms of phenyl hydrazine and oxalo-adipic ester, may be illustrated by formulae as follows:

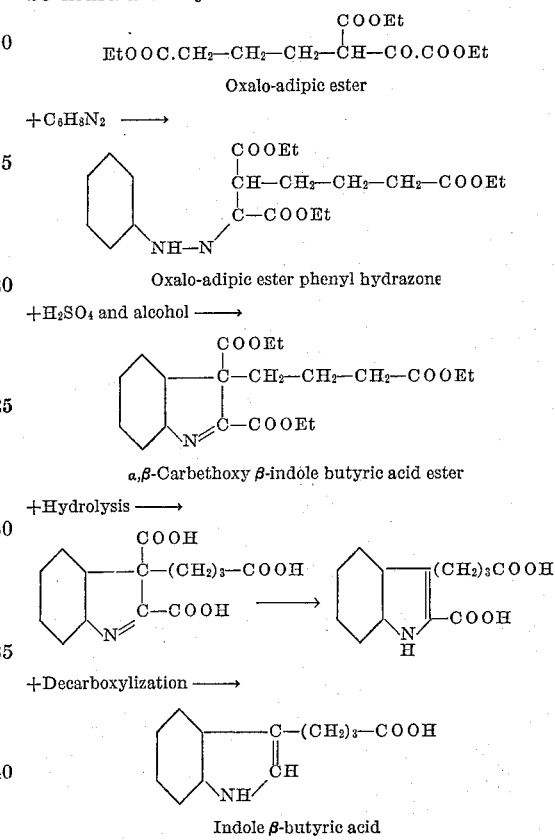

The above-illustrated reaction with phenyl hydrazine is general for the tri-basic esters produced by condensation of oxalic ester with the ester of a higher aliphatic dicarboxylic acid for the ultimate production of indole $\beta$-butyric acid or its homologues. Thus, for example, if oxalo-succinic ester is substituted for the oxalo-adipic ester illustrated, indole-$\beta$-acetic acid will be obtained as the end product.

The following detailed examples will serve to illustrate the process of my invention and the several variations or modifications in procedure which may be made as indicated above. These examples are given in terms of oxalo-adipic ester and phenyl hydrazine. However, as already indicated, these reactants are given by way of illustration, and not limitation, because the reaction is general for tri-carboxylic acid esters produced as described and phenyl hydrazine, and those skilled in the art will readily understand which tri-carboxylic acid ester should be appropriately substituted for the oxalo-adipic ester illustrated in order to obtain any desired homologous β-substituted indole acid.

EXAMPLES

*Example 1*

About 30 g. of oxalo-adipic ester, 14 g. of phenyl hydrazine, and 23 cc. of conc. HCl in 150 cc. of alcohol and 20 cc. of water are refluxed for about 10 hours. The dark-colored solution is evaporated in vacuo, the product is pressed out well, and then washed by stirring in ether to remove unreacted phenyl hydrazine. The mother liquors may be further worked up. The crude indole α-carboxy β-butyric acid thus obtained may be purified by dissolving in alkali, shaking out neutral substances with ether, filtering over charcoal and reprecipitating with cold acid. This dibasic acid is then heated in boiling tetralin (1:4) for 2 hours until decarboxylization is complete. On cooling, crystals of indole-β-butyric acid are obtained, which can be purified by known methods.

*Example 2*

About 30 g. of the tri-ester, 20 cc. of glacial acetic acid, 80 cc. of water, and 23 cc. of conc. HCl are refluxed for about 2 hours.

To the reaction mixture, after gas evolution ceases, is added about 10.8 g. of phenyl hydrazine, and the mixture is refluxed for about 4 hours. The resultant product is evaporated to a small volume; the concentrate is dissolved in ammonium hydroxide; the neutral substances are removed with ether, charcoal is added, and the filtered solution, acidified. The indole-α-carboxy β-butyric acid is precipitated and collected, and is then converted to indole β-butyric acid as described in Example 1.

*Example 3*

About 91 g. of the tri-ester, 30 cc. of conc. hydrochloric acid, 91 cc. of water, and 46 cc. of alcohol are refluxed for about 3 hours. In about 3½ hours, about 8 g. of $CO_2$ are evolved. The mixture is then cooled and about 29 g. of phenyl hydrazine are added, and the mixture is again refluxed for about 3 hours. After evaporation, the residue is taken up in dilute alkali, shaken with ether, treated with eponite, cooled, and slowly acidified. The precipitated di-acid crystallizes and is filtered, dried and decolorized by washing with ether. It is then converted to indole butyric acid as described in Example 1.

*Example 4*

About 130 g. of tri-ester are refluxed in dilute hydrochloric acid (480 cc. water and 64 cc. conc. HCl); when evolution of carbon dioxide ceases, 36 g. of phenyl hydrazine are added and the mixture refluxed for about 4 hours. The crude dibasic acid is converted to indole butyric acid in accordance with Example 1.

*Example 5*

About 130 g. of the tri-ester are refluxed with 36 g. of phenyl hydrazine in 350 cc. glacial acetic acid containing about 130 cc. of conc. hydrochloric acid. Evolution of $CO_2$ takes place rapidly. The mixture is refluxed for about six hours, evaporated to dryness, and the product indole α-carboxy β-butyric acid purified as described above.

I have also prepared the di-basic acids by a method which involved the isolation of an intermediate α-keto dibasic acid by suitable treatment of the tri-ester, as will hereinafter be described; the α-keto dibasic acid may then be condensed with phenyl hydrazine. The resulting product is the half ester of the α-carboxy indole acid, from which the free acid may be obtained. This method is illustrated in detail in the following specific example:

*Example 6*

About 100 g. of the crude tri-ester is refluxed for about 10 hours with about 200 cc. of conc. hydrochloric acid and 400 cc. of water. The hot solution is filtered and evaporated to dryness under vacuum. The residue solidifies and is washed carefully with a 1:1 ether-petroleum ether mixture. About 50 gms. of crude α-keto pimelic acid are thus obtained.

To this acid about 45 g. of phenyl hydrazine hydrochloride in about 170 cc. of dilute alcohol (150 cc. of alcohol and 20 cc. of water) are added, and the mixture heated on a steam bath for about 4 hours. The mixture is cooled and the reaction product filtered off. On evaporation, a second yield is obtained. The product is recrystallized from dilute alcohol several times until a constant melting point is obtained. Indole α-carboxy β-butyric acid half ethyl ester is obtained. The ester is boiled for a short time in dilute alkaline solution, cooled and acidified, and the free di-basic acid precipitates. This is converted to indole β-butyric acid by decarboxylization, which is accomplished by boiling the free acid in tetralin (tetra-hydro-naphthalene) for about 3 hours, and recrystallizing the product from benzene.

In the following, are illustrated the processes according to which the esters of the two aliphatic dicarboxylic acids may be condensed to form the tri-ester employed as starting material in the process of my invention. These processes are described in terms of oxalic ester and adipic ester, but it will be understood that the steps of the processes and the reactants involved may be modified as desired or required, for the condensation of esters of other members of the aliphatic dicarboxylic acid series.

1. PROCESS USING SODIUM ETHYLATE

*a*. About 27.6 g. of sodium are added to 16 parts of absolute alcohol. The alcohol is evaporated off. About 250 cc. of dried ether are added and 180 g. of diethyl oxalate dropped in gradually with cooling. Then 204 g. of adipic ester are added. The mixture solidifies on standing. After about 72 hours, cold dilute hydrochloric acid is added until the mixture is acidic. The ether layer is evaporated, and the crude ester is boiled with dilute hydrochloric acid in order to produce α-keto-pimelic acid.

*b*. The condensation is effected as in (*a*), except that 250 cc. of dried benzol are added to the alcohol-free sodium ethylate, and a mixture of the esters is then run in gradually with cooling. The reaction mixture is stirred for about 8 hours at room temperature. The flask is then allowed to stand for about 48 hours. A small measured sample is removed from the mixture and is shaken with water containing a small amount of $K_2CO_3$. The oxalo-adipic ester goes into the alkaline aqueous solution, since it contains an acidic enol group, whereas the unchanged esters remain in the inert solvent. On acidifying, the oxalo-adipic ester separates, and is extracted.

2. USING SODIUM PARTICLES a. About 12 g. of sodium in 300 cc. of petrolatum and 100 cc. dried xylene are heated above the melting point of the sodium and allowed to cool to room temperature, with vigorous stirring. To this suspension of finely divided sodium a mixture of 82 g. of adipic ester and 82 g. of oxalic ester is added gradually through a dropping funnel, while cooling to 15–20°, and stirring. About 5 cc. of absolute alcohol are added to start the reaction, which then proceeds with hydrogen evolution for about 4 hours. The mixture is warmed during another 4 hours to 50°, with stirring. Almost all of the sodium is used, and a red layer separates out on the bottom. The mixture is extracted with cold water in order to extract the sodium enolate, and this aqueous solution is acidified and extracted with ether.

b. The procedure outlined in (a) is repeated using about 27.6 g. of sodium in about 240 cc. of petrolatum and 120 cc. of xylene. To the sodium suspension, a mixture of 204 g. of adipic ester and 180 g. oxalic ester is added. About 2 cc. of absolute alcohol are added to start the reaction. The mixture is stirred for about 48 hours and samples are taken as previously described, the red, lower layer turns into a yellow pasty mass after about 48 hours. The supernatant liquor is poured off and extracted separately with cold water. Enough water is added to the sodium salt paste to dissolve it. Upon acidification, the combined aqueous solutions are extracted with ether, to obtain the tri-ester.

From the foregoing specific illustrations and descriptions of my process, it will be clearly apparent that certain modifications and deviations may be made in my disclosures without departing from the spirit of my invention and the scope of the appended claims.

I claim:

1. The process for the production of indole acids comprising reacting an ester of oxalic acid with an ester of a higher dibasic aliphatic acid, condensing the tricarboxylic acid ester thus obtained with phenyl hydrazine in the presence of a mineral acid, and subjecting the reaction product to thermal treatment.

2. The process for the production of indole acids comprising reacting an ester of oxalic acid with an ester of a higher dibasic aliphatic acid, condensing the tricarboxylic acid ester thus obtained with phenyl hydrazine in the presence of hydrochloric acid, and heating the reaction product in a high-boiling solvent.

3. The process for the production of indole acids comprising reacting an ester of oxalic acid with an ester of a higher dibasic aliphatic acid, condensing the tricarboxylic acid ester thus obtained with phenyl hydrazine in the presence of hydrochloric acid, and heating the reaction product in tetralin.

4. The process for the production of indole acids comprising condensing oxalo-adipic ester with phenyl hydrazine in the presence of a mineral acid and heating the reaction product in a high-boiling solvent.

5. The process for the production of indole acids comprising condensing oxalo-succinic ester with phenyl hydrazine in the presence of a mineral acid and heating the reaction product in a high-boiling solvent.

6. The process for the production of indole acids comprising condensing oxalo-adipic ester with phenyl hydrazine in the presence of hydrochloric acid and heating the reaction product in tetralin.

7. The process for the production of indole acids comprising condensing oxalo-succinic ester with phenyl hydrazine in the presence of hydrochloric acid and heating the reaction product in tetralin.

CARL N. ZELLNER.